F. H. Harwood,
Converting Motion.

No. 19,848. Patented Apr. 6, 1858.

UNITED STATES PATENT OFFICE.

FOREST H. HARWOOD, OF RUSHVILLE, NEW YORK.

CONVERTING RECIPROCATING INTO ROTARY MOTION.

Specification of Letters Patent No. 19,848, dated April 6, 1858.

*To all whom it may concern:*

Be it known that I, FOREST H. HARWOOD, of Rushville, in the county of Yates and State of New York, have invented a certain new and useful improvement in mechanism for converting rotary into reciprocating rectilinear motion, and vice versa, applicable as an attachment to piston-rods of steam-engines to produce a rotary motion for driving machinery and to other purposes; and of which the following is a full, clear, and exact description, reference being had to the accompanying drawing, which forms part of this specification, and in which—

Figure 1:
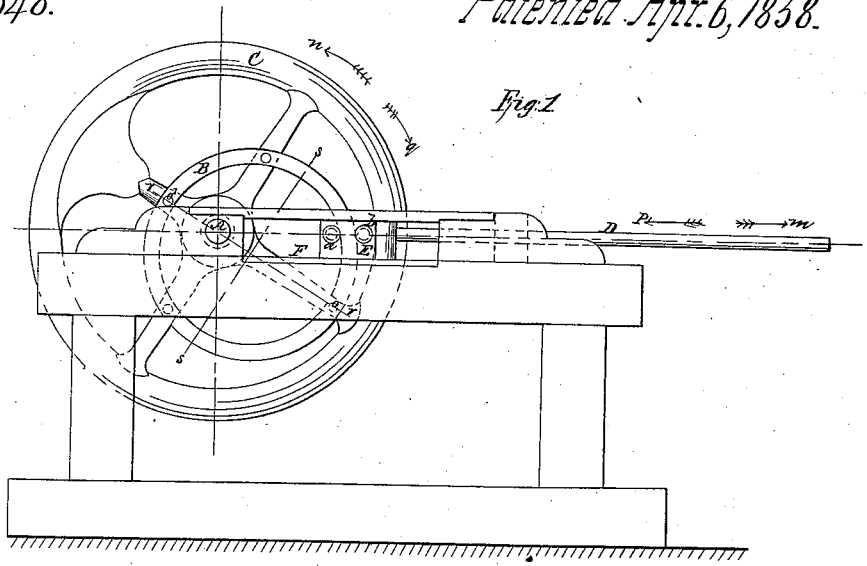

Figure 1 represents a side elevation, Fig. 2 a top view or plan, and Figs. 3 and 4 diagrams in illustration of the action as hereinafter referred to.

Revolving eccentrics, cams, or grooved disks, are in themselves common devices for operation in connection with rods having a reciprocating rectilinear motion, by the gear of the same together in various ways for different purposes; also modifications of these devices, or some of them, have before been used for converting reciprocating rectilinear into rotary motion and vice versa. To such therefore, in the abstract, I here lay no claim; but wherein my invention importantly differs from previous constructions, combinations or relative arrangements of revolving cam shaped devices and reciprocating rods, in gear together and the one operated by the other, the following description of details will explain.

Figure 2:
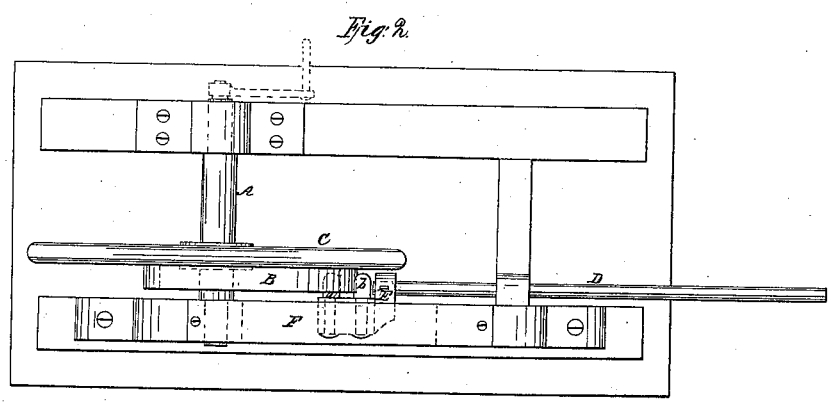
Figures 3, 4:
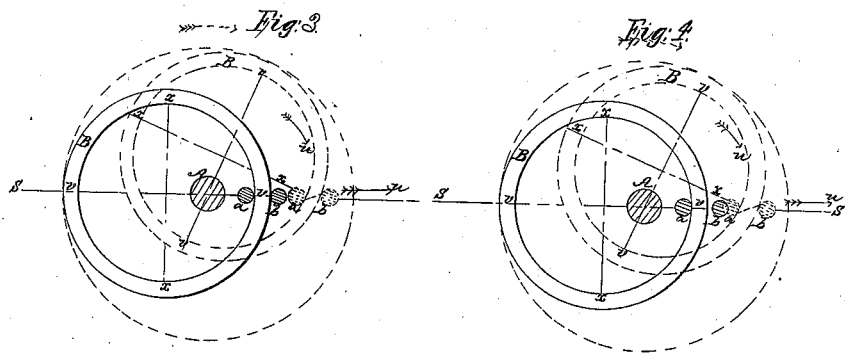

Referring to Figs. 1 and 2, of the drawing, a revolving shaft (A), working in suitable bearings, has mounted on it an eccentric or cam ring (B), for rotation with the shaft. This ring (B) may be connected with the shaft (A) in any desired manner, and is represented in the drawing as bolted on to the face of a fly wheel (C) fast to the shaft. It is necessary that the ring (B) should occupy an eccentric relationship to the shaft (A). In speaking here of a ring, I do not restrict it to a geometrical definition of that term, but mean to imply an endless band approximating more or less to a ring in shape, but which may be made partially or wholly of oval or egg shape without injuriously affecting its general action or operation, and, to secure an easy and smooth working in connection with a reciprocating rod, I make said band of varied thickness as hereinafter explained. In gear with this ring (B), in the manner of an edge clip, at any given point in its circumference, is a rod (D), to which it is designed to give a reciprocating rectilinear motion, by the action of the ring on it, or, which, having a reciprocating rectilinear motion, is required to give a rotary motion to the shaft (A), by the action of the rod on the ring. This rod (D) is arranged for travel in a radial direction to the shaft (A), and may be guided in such direction by any suitable means. Instead of said rod (D) being notched or bent to receive or clip the ring edgewise, it may be attached to a head block (E) that, as the rod reciprocates, works in or along a guiding bearing (F), and said head block—the construction of which may be varied—be provided with rollers, projections or clips (a, b), arranged to receive or clip between them, edgewise, the band or ring (B), and so establish the gear of the rod with the ring. The uses to which this arrangement may be applied are numerous.

Supposing the rod (D) to be the plunger rod of a pump, the necessary reciprocating rectilinear motion is given to it by rotating the shaft (A) and eccentric ring (B). Or, supposing the rod (D) to be the reciprocating piston rod of a steam engine, the arrangement is such that said rod, each double stroke, will cause the shaft (A) to make one revolution, the same being produced in a most free and easy manner by the action of the reciprocating rollers or clips (a b) on the eccentric ring (B). In either case, the action is a direct one and room and power thereby economized. No cumbrous yoke is required to act on opposite sides of the shafts (A), to enable the reciprocating rod (D) to give out a rotary motion to the shaft (A), the action being all on one side of the shaft; nor need the shaft (A) be intersected or cut away on either side, to admit of the necessary play of the parts. Thus, this arrangement has advantages over the ordinary crank as a means of producing a rotary motion from a reciprocating one, besides dispensing with a pitman; yet the action is as smooth and regular as that of the crank, and the arrangement is free from that irregularity of surface which, for the most part, characterizes previous cam actions designed as substitutes for the crank; the cam, in the present case, being a plain or smooth eccentric without any abrupt departure from perfect rotundity. In numerous cases, where it would be inconvenient to attach a crank to a shaft to which it is required to give a rotary motion from a reciprocating one, the eccentric ring may be slipped over the shaft and be readily secured thereto for action on it of the clips as described.

In action, the arrangement somewhat resembles that of the crank, there being two dead points or centers in each revolution of the ring (B), which it is the object of the fly wheel (C), as in the case of the crank, to overcome or pass. These dead points occur when the ring (B) occupies a position, relatively to the shaft (A), so that a straight line extended through the center of the shaft (A) and clips (a b) would also intersect the center or centers from which the eccentric ring (B) is struck; and this position necessarily occurs twice in each revolution. Such a position of the ring (B), clips (a, b), and shaft (A), is shown by full black lines in the diagrams, Figs. 3 and 4. In all other positions of the ring between the arrival of its center or centers in straight line with the shaft and clips on either side of the shaft, the effect of the clips (a b), pulling or pushing on the ring, tends to produce a rotary motion.

Supposing the parts to be in the position represented in Fig. 1, and the rod (D) to be moving as indicated by the black arrow, $m$, the one clip (a) would pull upon the ring (B), to turn the ring, fly wheel, and its shaft, in the direction of the black arrow, $n$, till the one dead point or portion (o) in the ring arrived between the clips (a b), when the fly wheel would aid the ring to pass this position, and, the motion of the rod (D) being reversed and thereby causing the other clip (b) to press on the ring, the movement of the ring, fly wheel and its shaft, would be continued in the same direction, till the opposite dead point or portion ($o^1$) of the ring arrived between the clips; and so on in continuous succession. Or, supposing the parts to be in the positions shown in Fig. 1, and the rod (D) to be started in direction of the red arrow (p), then the motion given to the ring, fly wheel, and shaft, would be in direction of the red arrow (q).

A straight line (r r) drawn to intersect the center of the shaft (A) and center or centers of the ring (B), and extended on either side through the ring, will cut the ring at the portions which form the dead points, and at these points or portions, when passing between the clips (a b), the action of the clips on the ring is a radial one, but, at every other position of the ring between the clips, the action is a tangential one, which causes the distance between the clips for constant contact of both clips with the ring to vary, the tangent gradually increasing and then diminishing for each half of the ring that lies on either side of the line, r r, which intersects the dead points of the ring. To produce a constant gear of both clips then, or nearly so, I construct the ring of varied thickness, as shown by the portions of the ring included between the intersecting line, r r, and another line, s s, running transversely thereto through the center of the ring. The object of thus constructing the ring will be more readily understood by examining the diagrams, Figs. 3 and 4. In these diagrams, the movements of the clips (a b) and ring (B) is supposed to be in the directions of the arrows, $u u$, and the circle in dotted black lines represents the outer circumference or path of the ring's travel. The position occupied by the ring, in black lines, in these figures, is that of a dead point in gear with the clips; the dotted lines, $v v$, and, $x x$, corresponding to the lines, r r, and, s s, in Fig. 1; and the line, S, indicates the direction or path of the travel of the clips.

In one of these diagrams (Fig. 4), the ring (B), it will be seen, forms a perfect circle or band of equal thickness. Now, observe the position of the same ring as it is indicated by red lines in that figure, and it will be seen that the gear of the clips with the ring is tangential, and in order to enable the ring when occupying this position to pass between the clips, they would necessarily require to be arranged much farther apart than requisite for them when the ring occupies the position shown for it in black lines of the same figure. Such construction of the ring then, that might answer for some purposes, would be objectionable in many, as in the case of a piston rod action, as, every time the rod changed its direction of motion, a vacant or loose play and sudden thump of a clip on the ring would take place, and the objectionable and damaging effect of this action would only be neutralized in part by the employment of a spring head block or spring attachment of the clips to the head block or slide of the piston rod. No such disconnected gear however takes place by shaping the ring as previously described, and as represented in Fig. 3; in which figure, the ring when occupying the same positions as it does in Fig. 4 (shown by corresponding black and red lines in both figures), and in all positions of it, is always in constant gear or contact with both clips (a b), by reason of the ring being made gradually thinner in opposite directions starting from either side of the line, $v v$, which intersects the dead points; and yet, while a constant and rigid gear of the clips and ring may thus be established, there is no interference with the proper action of the ring, and, practically speaking, no real or objectionable departure from a smooth and regular eccentric form.

The direct attachment of the ring to the fly wheel is preferable, as not only dispensing with a separate and additional contrivance or construction to establish the union of the ring with the shaft, but as giving a more immediate and direct relief to the ring in passing the dead points of its travel, than if the fly wheel were arranged disconnected from it on the shaft; and the ring further serves to brace the fly wheel and reduce objectionable vibration of its arms.

As either roller or clip ($a$ or $b$) conveys, or has thrown on it, the driving pressure alternately, the same are prevented from undue "heating." If the clips ($a\ b$) be rollers, working on axles projecting say from the side of the head block, to distribute over a more extended surface of clip, than if not rollers, the wear produced by their driving rub or pressure on the ring, they may be made of large or small diameter according to the heaviness of the work or driving or driven velocity of the ring. If rollers, as they never act against the ring but from one side of their axles, no objectionable change, to offer an impediment, in the directions of their rotation takes place during the reverse actions of the reciprocating rod to rotate the ring. But little if any objection applies to employing rollers, in this connection, as the ring (B) being constructed of tapering thickness as described, to produce a constant gear, or nearly so, of both rollers (clips) with it, all violent jumping or serious abrupt throw of the rollers against the ring each change of stroke in the reciprocating rod, which would occasion damage to the rollers, or strainage, if not breakage, of their axles, is avoided.

What I claim as new and useful herein, and desire to secure by Letters Patent, is:

1. The arrangement, substantially as herein shown and described, of a revolving eccentric ring or band (B), with edge clips ($a\ b$) of a reciprocating rod or its equivalent, for operation together to produce a revolving motion from a reciprocating one, and the reverse, as specified.

2. And I further claim the combination with the reciprocating clips ($a\ b$) of the rod (D) having a radial action to the ring shaft (A), of the endless band (B) arranged eccentrically to its shaft; when said band is made of diminishing thickness in opposite directions from its dead points or portions, for operation with the clips in the manner and for the purposes set forth.

3. And lastly I claim connecting the revolving eccentric ring or band (B) that reciprocates the clips ($a\ b$) or is revolved by them, with its shaft, by or through the fly wheel which aids the ring in passing its dead points or centers; whereby the fly wheel is braced by the ring, and more immediate relief is given to and generally diffused over the latter.

In testimony whereof, I have hereunto subscribed my name.

FOREST H. HARWOOD.

Witnesses:
 JOHN SAYRE,
 T. E. SMITH.